United States Patent [19]

Hoyland et al.

[11] Patent Number: 4,846,336
[45] Date of Patent: Jul. 11, 1989

[54] CONVEYOR SYSTEM

[75] Inventors: Trevor B. Hoyland; Richard Payne, both of Norfolk, England

[73] Assignee: Thurne Engineering Co. Ltd., Norwich, England

[21] Appl. No.: 131,977

[22] Filed: Dec. 10, 1987

[30] Foreign Application Priority Data

Dec. 10, 1986 [DE] Fed. Rep. of Germany ....... 3642123
Aug. 12, 1987 [GB] United Kingdom ................. 8719101

[51] Int. Cl.⁴ ............................................. B65G 47/26
[52] U.S. Cl. ..................................... 198/432; 198/436
[58] Field of Search ............... 198/419, 420, 431, 432, 198/434, 463.6, 436, 631, 458, 817, 587, 448

[56] References Cited

U.S. PATENT DOCUMENTS

| | | | |
|---|---|---|---|
| 2,880,847 | 4/1959 | Kelley | 198/817 |
| 3,545,588 | 12/1970 | Corley | 198/817 |
| 3,854,569 | 12/1974 | Steinhart et al. | 198/434 |
| 3,860,232 | 1/1975 | Martin | 198/458 |
| 4,067,435 | 1/1978 | Toby | 198/419 |
| 4,120,393 | 10/1978 | Motooka et al. | 198/463.6 |
| 4,244,461 | 1/1981 | Fischer et al. | 198/817 |

FOREIGN PATENT DOCUMENTS

1266703 4/1986 Fed. Rep. of Germany ...... 198/436

Primary Examiner—Frank E. Werner
Assistant Examiner—James R. Bidwell
Attorney, Agent, or Firm—Sughrue, Mion, Zinn, Macpeak and Seas

[57] ABSTRACT

A conveyor system for positioning slices of meat or other foodstuffs by converting M input streams of products into N output streams of products where M is an integer greater than one and N is an integer not equal to M comprises an input conveyor (15, 55) for conveying M input streams and an output conveyor (16, 58) for conveying N output streams. It also includes a multi-element strip conveyor (17, 18, 56, 57) having its upstream input end arranged to receive products (P) from an input stream and having its downstream end arranged to move laterally to deposit products from the input stream into an output stream shifted laterally with respect to the input stream. The conveying elements (37, 41, 67) of the multi-element strip conveyor (17, 18, 56, 57) are arranged to conform as its downstream and moves laterally.

6 Claims, 10 Drawing Sheets

CONVEYOR SYSTEM

BACKGROUND OF THE INVENTION

The present invention relates to conveyor systems for handling individual slices, stacks or shingles of slices of meat or meat products or other sticky, soft, or crumbly foodstuffs which need to be conveyed positively and which cannot be pushed by kerbs or guides and made to slide over the surface of a belt conveyor. It is particularly concerned with a system for changing the number of streams of products being conveyed along a flow line. There is a requirement both to combine two or more separate streams into one output stream and to multiply the two or more streams into three or more output streams.

Conventional conveyor systems for changing the number of streams of product usually include a simple flat belt conveyor and a series of fixed kerbs or belt conveyors operating in a vertical plane which guide the products in the lateral direction of the belt conveyor to merge two streams into one or to multiply the number of streams. Examples of these conventional conveying systems are described in FR-A-2587007 and FR-A-2168967.

Conventional systems that have been provided specifically for handling slices of meat or meat products include US-A-4431104 in which three successive products from a stream coming from one direction are fed to a turning table on which the direction of conveyance of the products is turned through 90°, so that, at the output of the turning table the three successive products form three separate streams of product on an output conveyor. The turning table is formed by intercallated belts and rollers which, by relatively raising and lowering them with respect to each other, make it is possible to either convey the products in the one direction, or in a direction at 90° to the one direction and so turn the products through 90°. Another prior conveyor system specifically intended to handle slices of meat and meat products is shown in GB Pat. No. 1546126 in which a single stream of product is fed via an overhead conveyor and placed on top of pieces of card fed along a second conveyor underneath the overhead conveyor with means being provided to synchronise the travel of the product and the card so that the product is deposited on the card.

SUMMARY OF THE INVENTION

According to this invention a conveyor system for positioning slices of meat or other foodstuffs by converting M input streams of products into N output streams of products where M is an integer greater than one and N is an integer not equal to M comprises input conveyor means for conveying M input streams and output conveyor means for conveying N output streams, and includes a multi-element strip conveyor having its upstream input end arranged to receive products from an input stream and having its downstream end arranged to move laterally to deposit products from the input stream into an output stream shifted laterally with respect to the input stream, the conveying elements of the multi-element strip conveyor being arranged to conform as its downstream end moves laterally.

Preferably the multi-element strip conveyor includes at its upstream end, a drive roller and at its downstream end an idler roller, both rollers being grooved to receive the conveying elements of the strip conveyor, the idler roller being movable laterally with respect to the drive roller and the elements of the strip conveyor being elastic to accommodate changes in length between the idler and drive roller as the idler roller is moved laterally. Preferably the conveying elements of the multi-element conveyor are formed by elongate bands of rubber or rubber-like elastomeric material having a substantially circular cross-section. It is also preferred that the idler roller is formed by a number of individual roller elements mounted on a common axle. Each of the individual roller elements receives one of the elements of the strip conveyor and each is free to rotate with respect to its neighbours around the common axle. Preferably the common axle is also free to rotate in its mounting.

The multi-element strip conveyor may carry more than one stream of products and more than one multi-element strip conveyor may be included in the conveyor system. The input conveyor means may be formed by M separate conveyors arranged generally side-by-side or may be formed by a single conveyor arranged to convey M input streams side-by-side. Equally, the output conveyor means may be formed by N separate conveyors or be formed by a single conveyor which conveys the N separate streams.

Where the number of input streams M is greater than the number of output streams N the input streams are separated in the vertical direction and where vertically separated, are moved laterally with respect to one another to overlap the streams. This may be done by having the multi-element strip conveyor on top or underneath a fixed conveyor or by having two multi-element strip conveyors one on top of the other with their downstream ends displaced laterally in opposite directions. With this arrangement the speed of the overlapped conveyors may be constant and their path length substantially the same so that side-by-side products from two adjacent streams are overlapped substantially one on top of the other or, alternatively, by controlling the relative speeds of the two conveyors it is possible to interleave the products of two input streams to form a single output stream.

Alternatively the number of output streams N may be greater than the number of input streams M and, in this case typically all of the conveyors in the conveyor system lie in the same generally horizontal plane. Also in this case the downstream end of the multi-element strip conveyor moves laterally backwards and forwards to deposit products from one input stream into one of two different output streams. Also in this case it is preferred that the output conveyor means includes individual short conveyors or liftable platforms which can be operated to stop the progress of products in the output streams individually to enable successive products from an input stream to be located side-by-side in adjacent output streams. Preferably the multi-element strip conveyor is arranged to convey at least two successive products from each input stream to each output stream before being moved laterally to convey successive products to a different output stream.

BRIEF DESCRIPTION OF THE DRAWINGS

Particular examples of conveyor systems in accordance with this invention will now be described with reference to the accompanying drawings in which.

DESCRIPTION OF PREFERRED EXAMPLES

Figure 1:
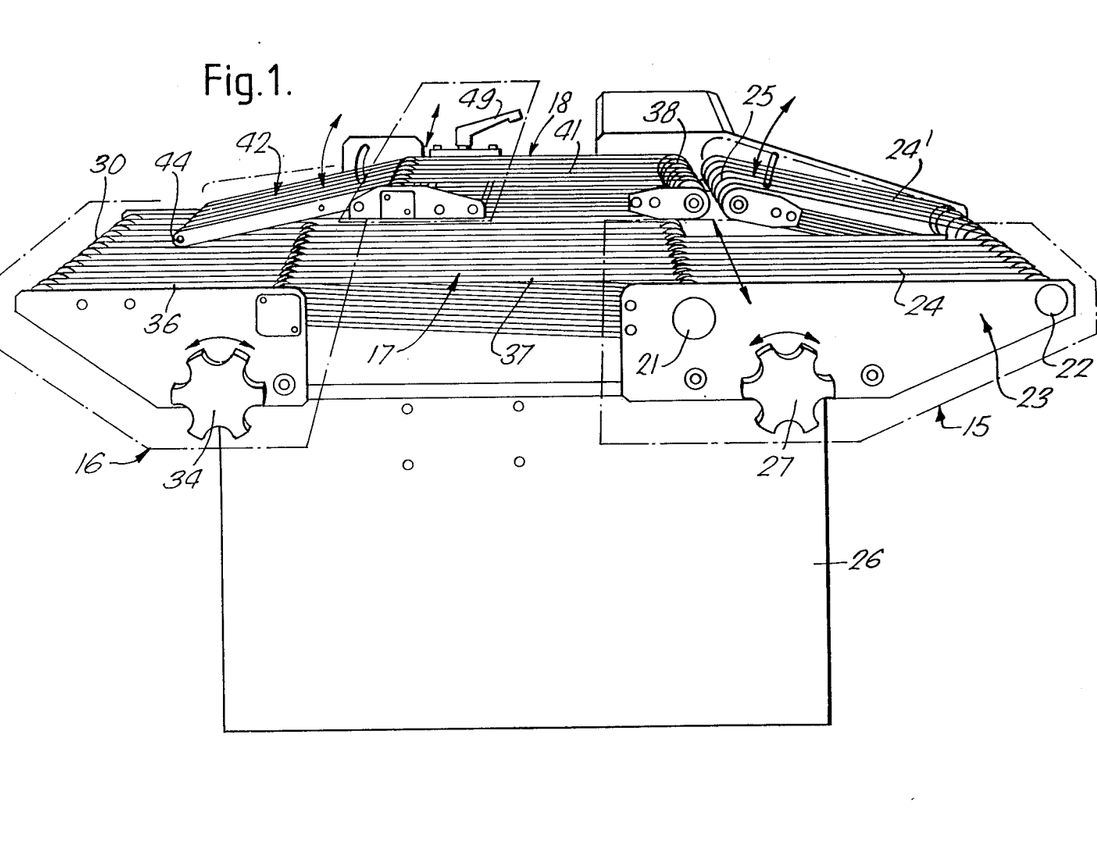
FIG. 1 is a perspective view of a first example.
Figure 2:
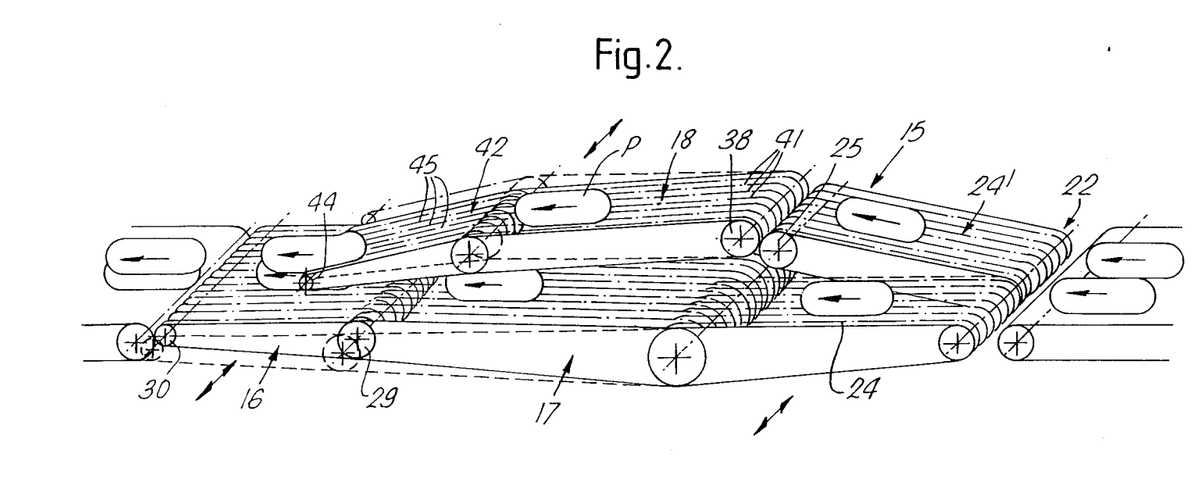
FIG. 2 is a diagrammatic perspective view illustrating the operation of the first example.
Figure 3:
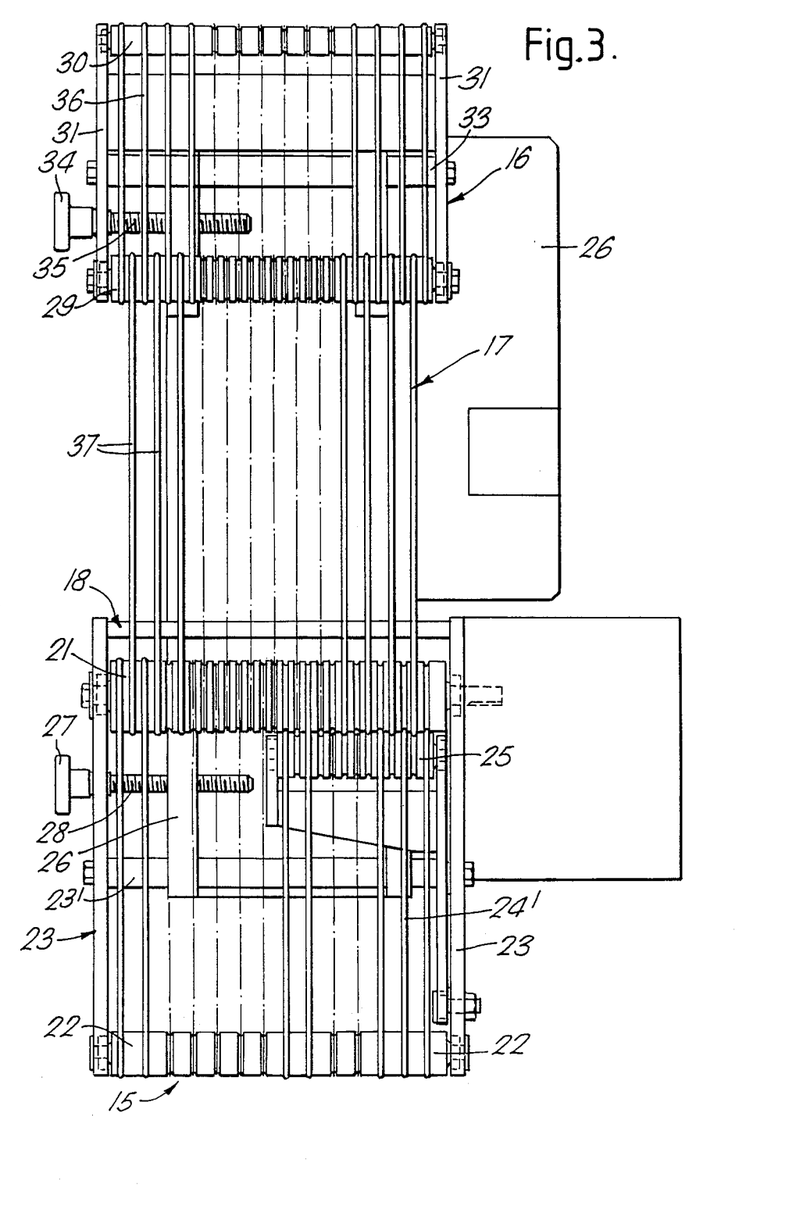
FIG. 3 is a plan view of the first example with the overhead conveyor removed for clarity.

A first example of conveyor system comprises an input conveyor 15 and an output conveyor 16 linked by a lower conveyor 17 and an overhead conveyor 18. Two streams of products P entering the input conveyor 15 are separated by one stream being handled by the lower conveyor 17 and the other being handled by the overhead conveyor 18. The two streams of products P are then over-lapped one on top of another as shown in FIG. 2 on the output conveyor 16.

The input conveyor 15 comprises a grooved drive roller 21 and a grooved idler roller 22 journalled into opposite ends of a supporting frame 23. The drive roller 21 and idler roller 22 are linked together by bands 24 which form a first, generally horizontal conveying surface of the input conveyor 15. A second grooved idler roller 25 is arranged to be moved up and down and bands 24' extend between the idler roller 22 and the second idler roller 25 to form an inclined portion of the input conveyor 16. The drive from the drive roller 21 transmitted by the belts 24 causes the idler roller 22 to rotate and in turn, move the bands 24' forming the inclined portion of the input conveyor 15. The second idler roller 25 is also supported from the frame 23.

Figure 5:
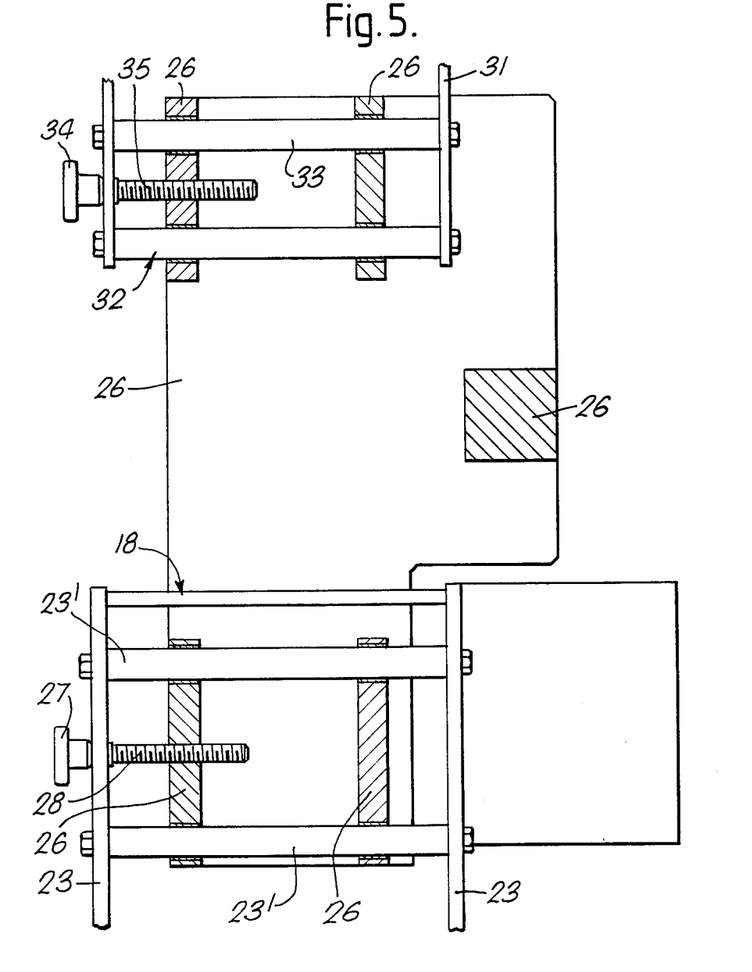
FIG. 5 is a horizontal section through part of the framework for the lower conveyor.

The frame 23 includes guide bars 23' journalled into a main frame 26 of the conveyor system. A hand wheel 27 connected to a lead screw 28 is secured by a thrust bearing in the frame 23. The lead screw 28 is screw threaded into the main frame 26 so that rotation of the hand wheel 27 causes lateral movement of the frame 23 and with it the entire input conveyor 15. These portions are shown most clearly in FIG. 5.

The output conveyor 16 comprises grooved rollers 29 and 30 mounted in a supporting frame 31. The supporting frame 31 includes guide rails 32 and 33 that are again journalled into the main frame 26 of the conveyor system and a hand wheel and lead screw arrangement 34 and 35 enable the frame 31 to be moved laterally in a similar fashion to frame 23. Bands 36 link the grooved rollers 29 and 30 to complete the output conveyor 21.

The lower conveyor 17 comprises bands 37 of elastic material such as silicone rubber having a substantially circular cross section located in the grooves of rollers 21 and 29. By adjusting the lateral position of the rollers 21 and 29 by the hand wheels 27 and 34, the lower conveyor 17 can move products laterally as it conveys them forward as illustrated most clearly in FIG. 2. The elastic nature of the bands 37 enables them to accommodate changes in their path length as the rollers 21 and 29 are moved relative to one another. The belts 37 transmit the drive from the drive roller 21 to the roller 29 and hence to the output conveyor 16. In this example the first portion of the input conveyor 15, the lower conveyor 17 and the output conveyor 16 all have their conveying surfaces lying in a substantially horizontal plane. However, the conveyor 17 and the rollers 21 and 29 may be at a lower level than the rollers 22 and 30 to give approximate mirror symmetry between the lower conveyor 17 and the overhead conveyor 18.

Figure 4:
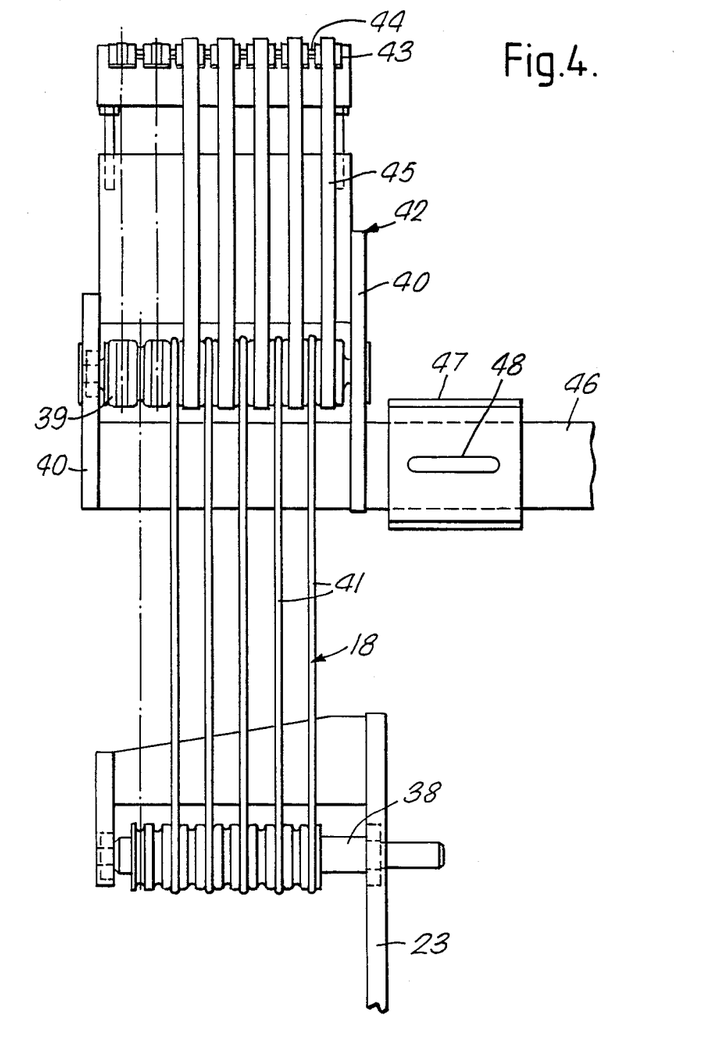
FIG. 4 is a plan view of the overhead conveyor.

The overhead conveyor 18 is shown in detail in FIG. 4 and comprises a grooved driven roller 38 which is journalled into and moves with the frame 23, an idler roller 39 which is journalled into a framework 40 and elastic belts 41 linking the grooved rollers 38 and 40. The belts 41 are elastic and again formed of silicone rubber with a substantially circular cross section. The overhead conveyor also includes an inclined discharge portion 42 which is also mounted on the frame 40 and includes a downstream roller formed by individual roller elements 43 for each belt journalled onto a freely rotatable axle 44. Flat belts 45 are connected between the roller 39 and the individual roller elements 43 to provide the conveying surface for the discharge conveyor 42. The downstream end of the discharge conveyor 42 is movable upwards and downwards to vary the height of the discharge end of the conveyor above the output conveyor 16.

The framework 40 includes a slider bar 46 which is arranged to slide through mounting 47 attached to the main frame 26. A screw threaded arm projects upwards from the slider bar 46 through a slot 48 in the mounting 47, and a clamping handle 49 (shown in FIG. 1) is screwed onto the threaded stud to clamp the slider bar 46 in position. In this way the lateral position of the framework 40 and hence of the idler roller 39 and discharge conveyor 42 can be adjusted with respect to the grooved roller 38, changes in the path length between the rollers 38 and 39 being accommodated by the elasticity of the belts 41. By adjusting the relative positions of the input and output conveyors using the hand wheels 27 and 34 and by adjusting the position of the discharge conveyor 42, it is possible to cause the two input streams of products supplied to the input conveyor 15 to be overlapped completely or to a predetermined extent as shown in FIG. 2.

Preferably, the drive rollers 21 and 38 are both powered from a common electric motor with an infinitely variable gearbox disposed between them so that the relative speeds of the overhead conveyor 18 and that of the remaining conveyors can be varied. In this way, it is possible to take account of any differences in path length between the lower conveyor 17 and the overhead conveyor 18 to ensure that products fed in the two streams to the input conveyor 15 are placed precisely in register one above the other. Alternatively, it is also possible to interleave products from one stream with those of the other to provide a single stream of evenly spaced products. The bands 24, 24' and 36 may be formed by flat belts similar to the belts 45 or may be formed by round section bands. Alternatively, all of these may be replaced by conveying chains or other non-extensible, flexible conveying elements.

Figure 6:
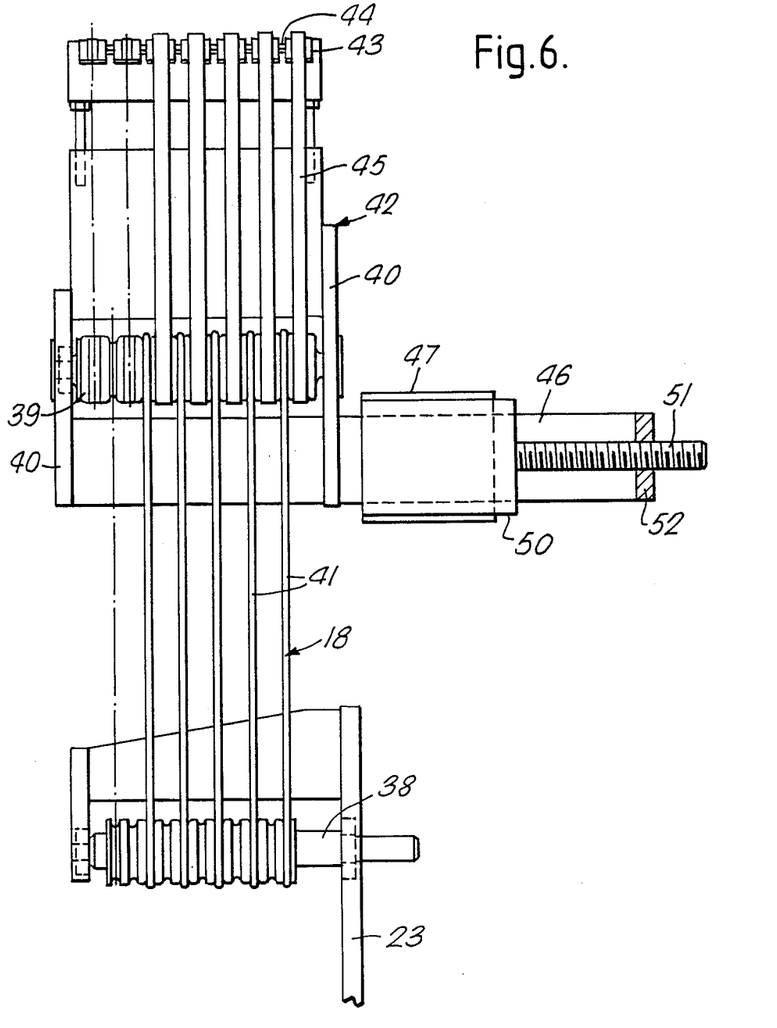
FIG. 6 shows a modification of the upper conveyor.

In a modification of the first example shown in FIG. 6, a stepping motor 50 is mounted on the support 47 and drives a lead screw 51 which is screw threaded into a portion 52 of the slider arm 46. Actuation of the stepping motor 50 rotates the lead screw 51 and causes the slider arm 46 to move laterally to vary the lateral position of the downstream end of the overhead conveyor 18.

Figure 7:
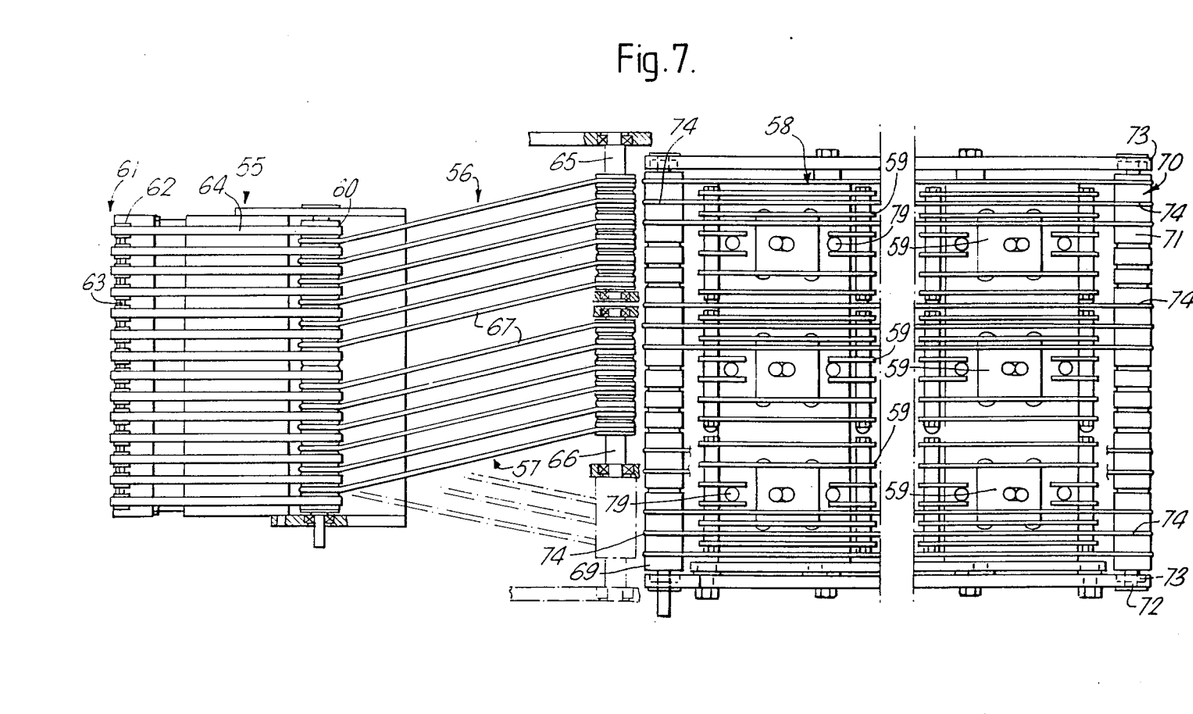
FIG. 7 is a plan view of a second example.

A second example of conveyor system in accordance with this invention is shown in FIG. 7 and comprises an input conveyor 55, two side-by-side multi-element strip conveyors 56, 57 and an output conveyor 58 which includes six support stations 59. The downstream ends of the multi-element conveyors 56 and 57 are arranged to move laterally independently of each other between the positions shown in solid lines in FIG. 7 and those shown in dotted lines in FIG. 7. In this way products entering the input conveyor 55 are moved laterally to the left or right by the conveyors 56 and 57 before being deposited upon the output conveyor 58. Thus, two streams of products entering the input conveyor 55 are formed into three separate streams on the output conveyor 58, as will be described in detail subsequently.

The input conveyor 55 comprises a grooved driven roller 60 and an idler roller assembly 61 formed by independent individual rollers 62 journalled onto an axle 63 which is also free to rotate. The idler roller assembly 61 and the grooved roller 62 are inter-connected by ribbons or flat belts 64 which from the carrying surface of the input conveyor 55.

The multi-element strip conveyors 56 include idler roller assemblies 65 and 66, respectively, and bands 67 of resilient elastomeric material such as silicone rubber of substantially circular cross section. The idler roller assemblies 65 and 66 are supported by a framework which is driven to the right and left by a motorised lead screw arrangement similar to that described in detail with reference to FIG. 6. The bands 67 accommodate the changing path length between the driving roller 60 and the idler roller assemblies 65 and 66 by stretching and contracting as the idler roller assemblies 65 and 66 move transversely. The idler roller assemblies 65 and 66 comprise separate rollers independently journalled onto a freely rotatable axle.

Figure 8:
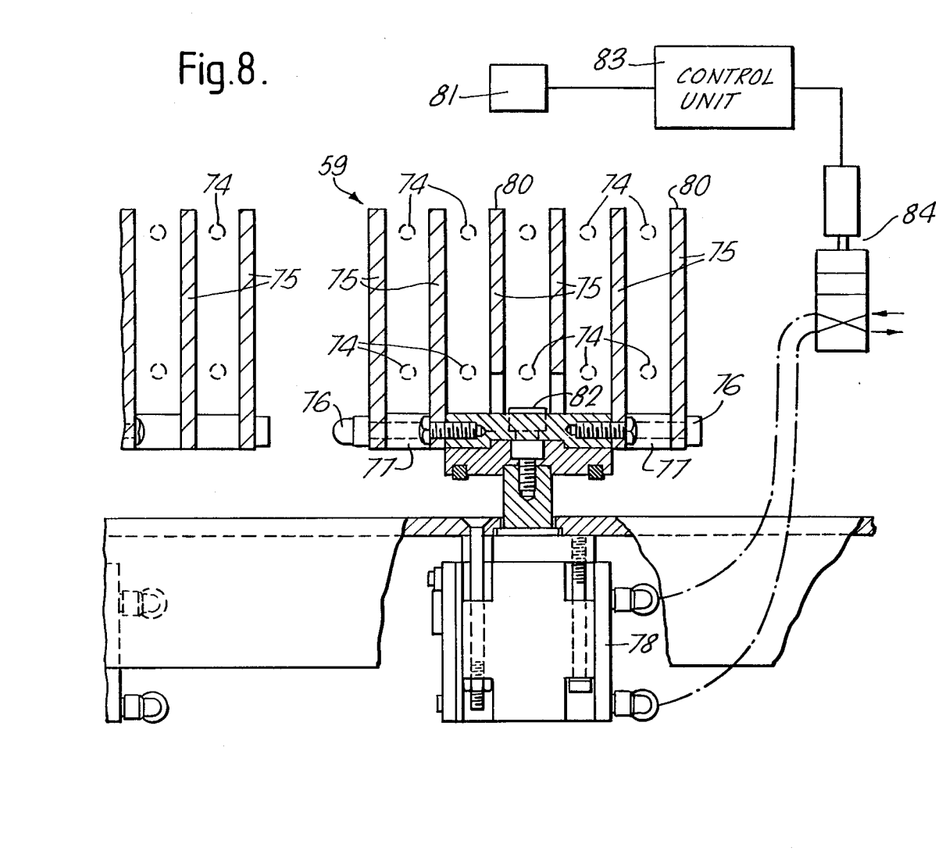
FIG. 8 is a vertical section taken along the lines VIII—VIII shown in FIG. 7.

The output conveyor 58 comprises a driven roller 69 and an idler roller assembly 70. The idler roller assembly 70 is formed by a number of individual roller elements 71, each of which is freely rotatable on an axle 72 which itself is journalled and free to rotate in bearings 73. The driven roller 69 and idler roller assembly 70 are connected together by bands 74. The support platforms 59 are shown in more detail in FIG. 8 and comprise a number of upright elongate plates 75 intercallated between adjacent bands 74 of the output conveyor 58. The plates are connected together by nuts and bolts 76 with spacers 77 located between adjacent plates 75. The plate assemblies are mounted onto the ram of a pneumatic piston and cylinder assembly 78 and are also connected to guide pins 79 which are guided in corresponding bores (not shown) to constrain the movement of the plate assemblies 75. Actuation of the pneumatic piston and cylinder assembly 78 brings the upper surfaces 80 of the plates 75 to a level above the upper surface of the bands 74, as shown in FIG. 8, while lowering of the pneumatic piston and cylinder assembly 78 moves the upper surfaces 80 of the plates 75 to a level beneath that of the upper surface of the bands 74. In use, by lifting support platforms 59 a product being conveyed by the bands 74 is lifted above their surface and so is held stationary whilst the bands 74 continue to move forwards.

The conveyor system also includes photoemitter/photodetector devices 81 and a retro-reflector 82 associated with each of the support platforms 59 and a computer based control unit indicated generally by reference numeral 83 to control the raising and lowering of the support platforms 59 by actuation of solenoid controlled valves 84, dependence on the presence of products in the region immediately above the support platforms 59. The driven roller 69 may rotate at a constant speed so that the linear speed of the conveyor 58 is matched to that of the input conveyor 55 and multi-element conveyors 56 and 57 or, alternatively, the driven roller 69 may be controlled by the control unit 82 to accelerate and decelerate so that products are substantially stationary as they engage and dis-engage the top surfaces 80 of the support platforms 59. In this case, any product being transferred from the conveyors 56 and 57 to the output conveyor 58 tends to bow slightly at the joint between the two but, since the output conveyor 58 is accelerated rapidly once the product is engaged or dis-engaged, any such bowing is quickly removed. The average speed of the output conveyor 58 is substantially the same as that of the other conveyors.

Figure 9A:
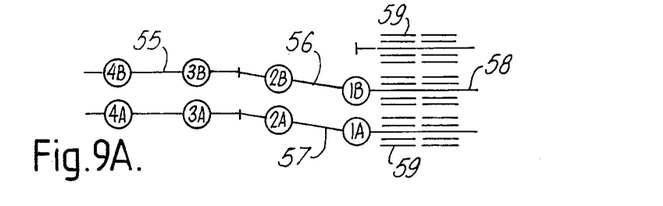
FIGS. 9A to 9E are a series of schematic diagrams showing how products are handled by the second example; and, FIG. 10A to 10F are a series of diagrams of a third example showing how products are handled by it.
Figure 9B:
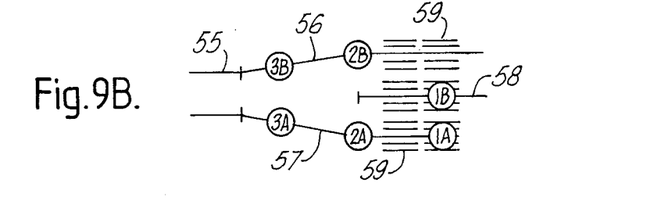
Figure 9C:
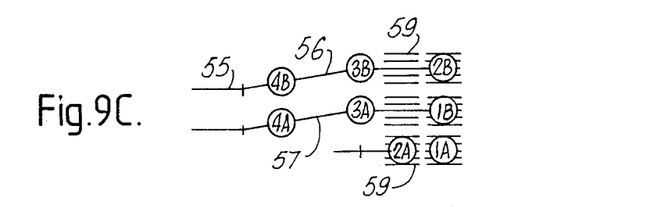
Figure 9D:
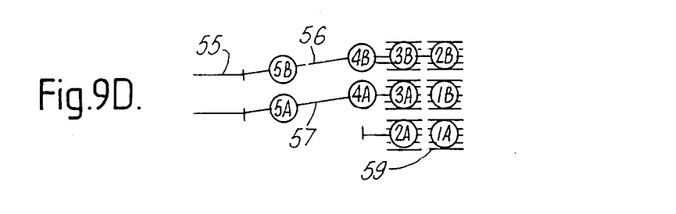

The sequence of operation of the second example is described with reference to FIGS. 9A to 9E. The products which in this case are shingled groups of slices of meat or meat product, are fed as two streams A and B to the input conveyor 55. In FIG. 9 the individual products are numbered sequentially. Assuming that at the start of the process the conveyors 56 and 57 are both to the right hand side as shown in FIG. 7, i.e. in the chain dotted position as shown in FIG. 7, then the first products from streams A and B are transferred to the output conveyor 58. Immediately after this has occurred, conveyor 56 is moved into its alternative leftmost position as shown in FIG. 9B so that when the products 2A and 2B reach the downstream end of the conveyors 56 and 57 they are fed to opposite sides of the output conveyor 58. As soon as the first products 1A and 1B are detected by the photosensors associated with the second support platforms in the right and middle lanes of the output conveyor 58, the support platforms are lifted to retain products 1A and 1B on these platforms. As products 2A and 2B are transferred onto the output conveyor 58, as soon as product 2A is detected by the photodetector associated with the first support platform 59 in the right hand lane of the output conveyor 58, this platform is raised to stop product 2A. Product 2B continues until it is detected by the photodetector associated with the second support platform 59 of the left hand lane of the output conveyor 58 whereupon this support platform is raised to stop the product 2B. As soon as product 2A has been transferred from the conveyor 57 to the conveyor 58 the conveyor 57 is moved to the left. This is the position shown in FIG. 9C. Then, the products 3A and 3B are transferred to the conveyor 58 and, upon their detection by the photodetectors associated with the first two support platforms of the left hand and middle lane of the output conveyor 58 the other support platforms are lowered so that the group of six products travels together and is discharged in a 3×2 format from the output conveyor 58 to a downstream packing machine, typically a vacuum packaging machine.

Figure 9E:
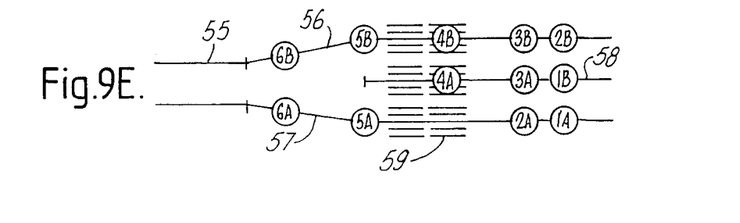

The next two products 4A and 4B are transferred directly from the conveyors 56 and 57 to the output conveyor 58. Immediately after the product 4A has left the conveyor 57, this is moved to its right most position. The following products 5A and 5B are then fed from the conveyors 56 and 57 to the output conveyor 58 and the second support platforms 59 on the left hand lane and middle lane of the output conveyor 58 are raised as the products 4B and 4A are detected to stop the forward progress of these products. This position is shown in FIG. 9E and this corresponds to the arrangement described with respect to FIG. 9B. The process then continues as before to provide batches of products in a 3×2 format.

Figure 10A:
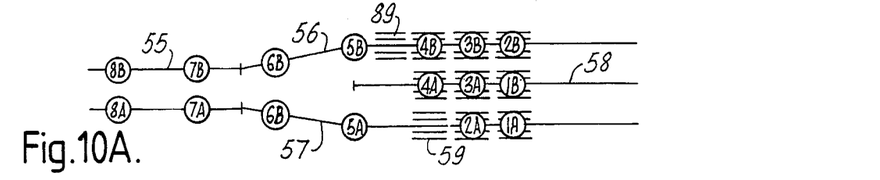
Figure 10B:
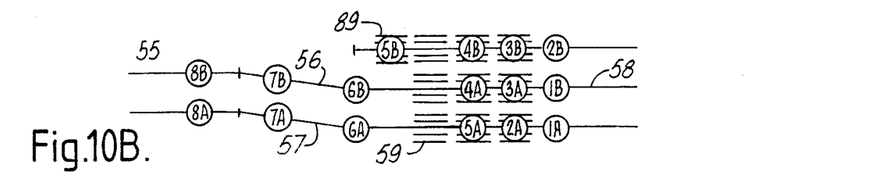
Figure 10C:
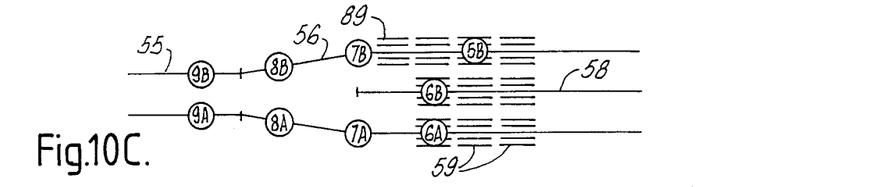
Figure 10D:
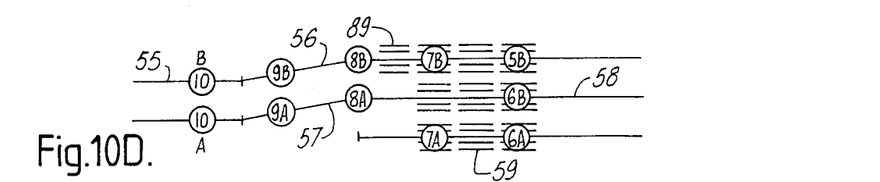
Figure 10E:
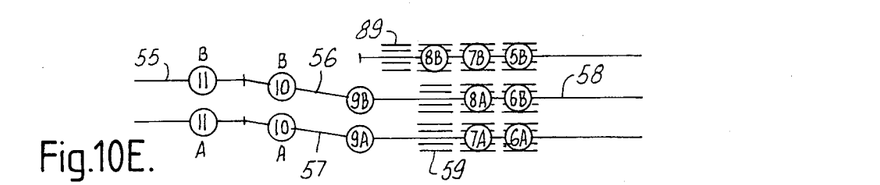
Figure 10F:
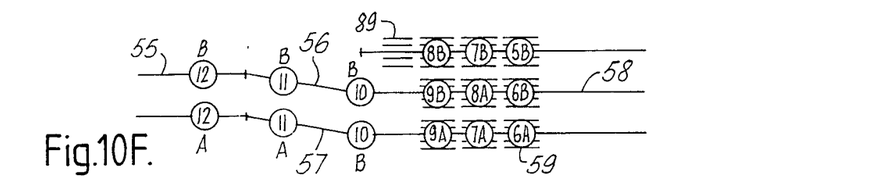

A third example of conveyor system in accordance with this invention is generally similar to the second example except that it includes three rows of platforms 59 and associated photodetectors, and one additional support platform 89 located in the left hand or right hand lane of the output conveyor 58. This arrangement enables batches of nine items in a 3×3 format to be produced. The third example operates in substantially the same way as the second example except that the initial products are stopped on the third row of support platforms 59 and the products are not discharged once a 3×2 format has been achieved. The first four products from lanes A and B are handled in precisely the same way as has been described with reference to FIG. 9. Thus, FIG. 10A corresponds to the arrangement shown in FIG. 9E where the last two rows of support platforms have all been loaded and are holding products stationary, whilst the left hand and middle lanes of the first row of support platforms are also holding products 4A and 4B. Upon the transfer of product 5A and 5B from the conveyors 56 and 57 product 5B is held by additional support platform 89 whilst product 5A continues forward on the output conveyor 58 until, upon its detection, all of the support platforms 59 are lowered so that a 3×3 batch of products is discharged from the output conveyor 58. After the product 5B has left the conveyor 56, this is moved to the middle lane as shown in FIG. 10B and the additional support platform 89 is subsequently lowered so that the product 5B from support platform 89 proceeds forwards along the output conveyor 58 at much the same time as products 6A and 6B are transferred from the conveyors 56 and 57 to the output conveyor 58. The support platforms 59 in the last row lift as the products 6A, 6B and 5B are detected so that these products are then stopped in the last row of support platforms 59. The process is continued as before until, as shown in FIG. 10E the products 9A and 9B are fed from the conveyors 56, 57 to the output conveyor 58. Upon detection of these two products all of the support platforms are again lowered to discharge a further 3×3 group of products to a downstream packaging machine. Thus, the additional support platform 89 is used to hold the odd product every other batch in the case where an even number of products are fed to the conveyor system and an odd number discharged.

The second example may be modified by the inclusion of two additional rows of support platforms and so provide batches of twelve products arranged in a 3×4 format. The provision of more additional support platforms 89 can also enable the use of configurations other than two input streams and three output streams. For example, three input streams and three of the movable multi-element conveyors, like conveyors 56 and 57 may be included to provide five output streams on the output conveyor. In this case, ten support platforms would be required to provide a 5×2 output format. Also in this case two additional support platforms 89 are required.

We claim:

1. A conveyor system for positioning slices of meat or other foodstuffs by converting M input streams of products into N output streams of products where M is an integer greater than one and N is an integer greater than M comprises input conveyor means (55) for conveying said M input streams, output conveyor means (58) for conveying said N output streams, and a plurality of multi-element strip conveyors (56,57) whose downstream ends have individual roller elements mounted on common arches, arranged side-by-side, each of said multi-element strip conveyors having an upstream input end, a downstream output end, independent motorized lateral movement means to move laterally said common axles at said downstream output end, and a series parallel being arranged conveying elements (67), said conveying elements being arranged to conform as said downstream end of said multi-element strip conveyor moves laterally, all of said conveyors in said conveyor system lying in the same generally horizontal plane, said upstream input end of each said multi-element strip conveyor being arranged to receive products from an input stream on said input conveyor means and said downstream end being arranged to deposit products into one of two output streams shifted laterally with respect to said input stream, said downstream ends of each of said plurality of multi-element strip conveyors being independently movable, and adjacent multi-element strip conveyors being capable of feeding products from adjacent streams into the same output stream at different times.

2. A conveyor system according to claim 1, wherein each of said multi-element strip conveyors includes at said upstream, input end, a grooved drive roller and at said downstream end grooved idler roller means both receiving said conveying elements of said strip conveyor, said idler roller means being movable laterally with respect to the drive roller by said lateral movement means and said conveying elements of said multi-element conveyor being elastic to accommodate changes in length between said idler roller means and said drive roller as said idler roller means is moved laterally.

3. A conveyor system according to claim 2, wherein said conveying elements of said multi-element conveyor are formed by elongate bands of one of rubber and rubber-like elastomeric material having a substantially circular cross-section.

4. A conveyor system according to claim 2, wherein said idler roller means comprise a plurality of individual roller elements mounted on a common axle, each of said individual roller elements receiving one of said conveying elements of said strip conveyor and being free to rotate with respect to its neighbors around said common axle, said common axle also being free to rotate.

5. A conveyor system according to claim 1, wherein said output conveyor means includes liftable platforms which are operable to lift products in said output sreams individually above said output conveyor to stop their forward progress to enable successive products from an input stream to be located side-by-side in adjacent output streams.

6. A conveyor system according to claim 5, wherein each of said multi-element strip conveyors is arranged to convey at least two successive products from each input stream to each output stream before being moved laterally to convey successive products to a different output stream.

* * * * *